July 9, 1929.  W. P. ALEXANDER  1,720,388
MATERIAL HANDLING APPARATUS
Filed June 20, 1927   3 Sheets-Sheet 1
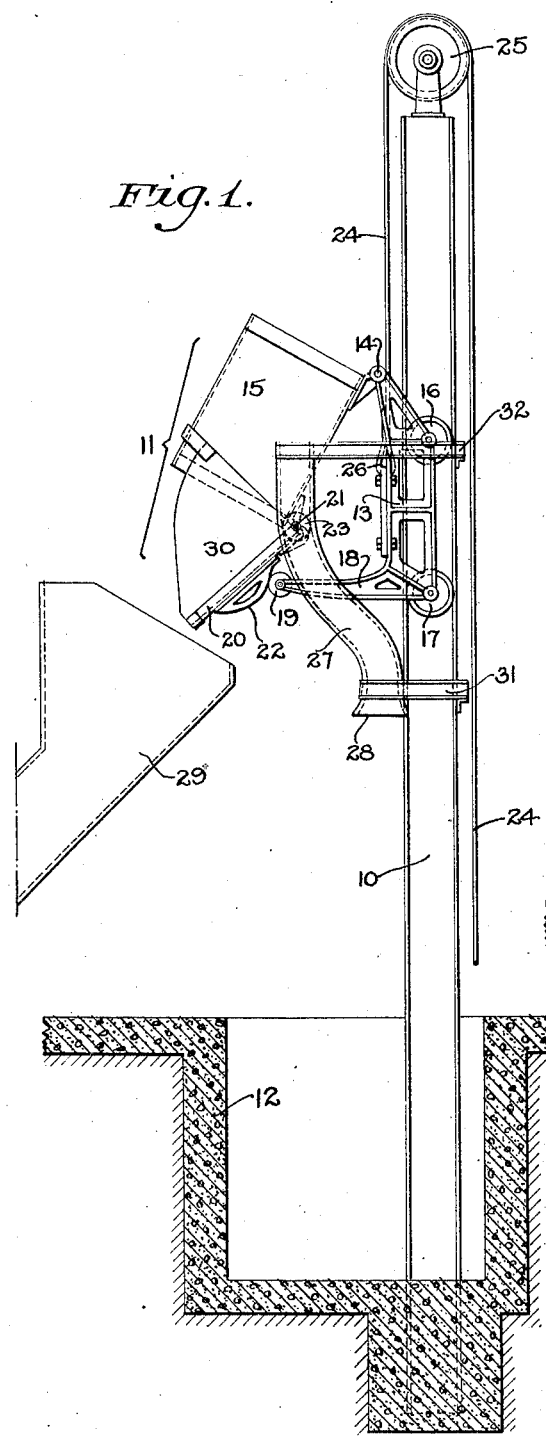
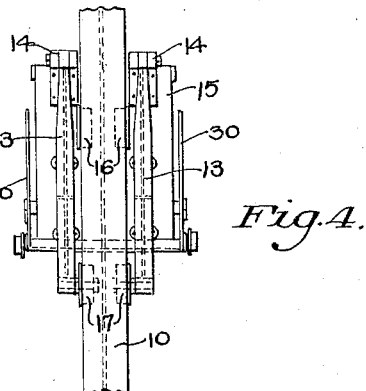
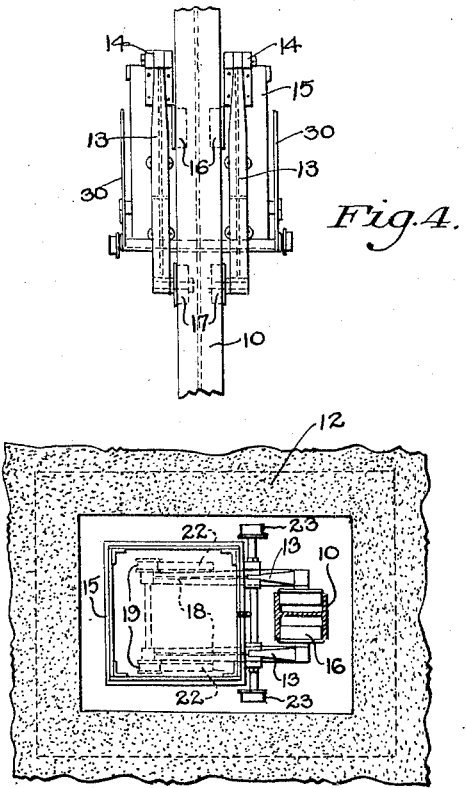
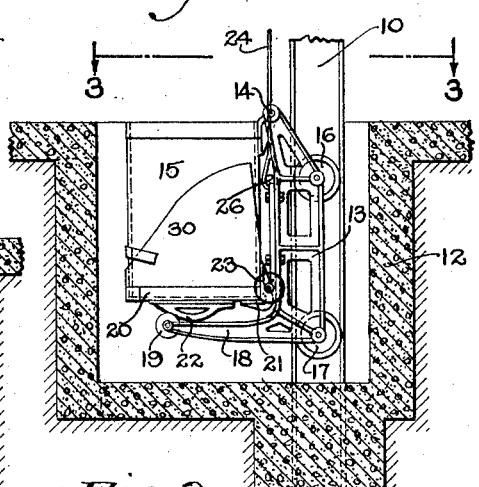
Inventor
WILLIAM P. ALEXANDER
By *Sealdelson*
Attorney.

July 9, 1929.　　W. P. ALEXANDER　　1,720,388
MATERIAL HANDLING APPARATUS
Filed June 20, 1927　　3 Sheets-Sheet 2
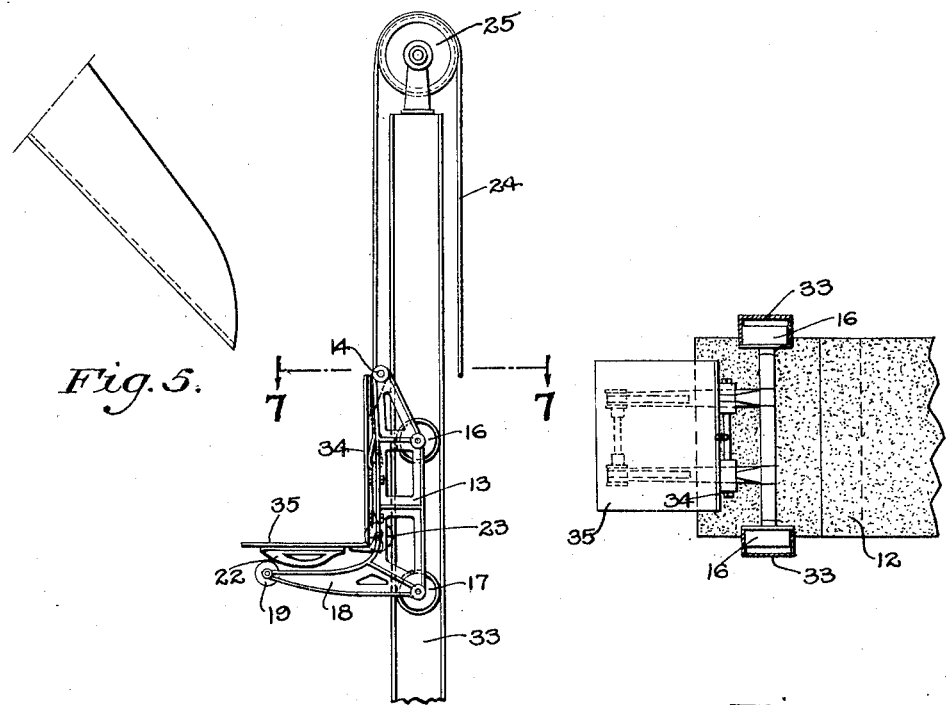
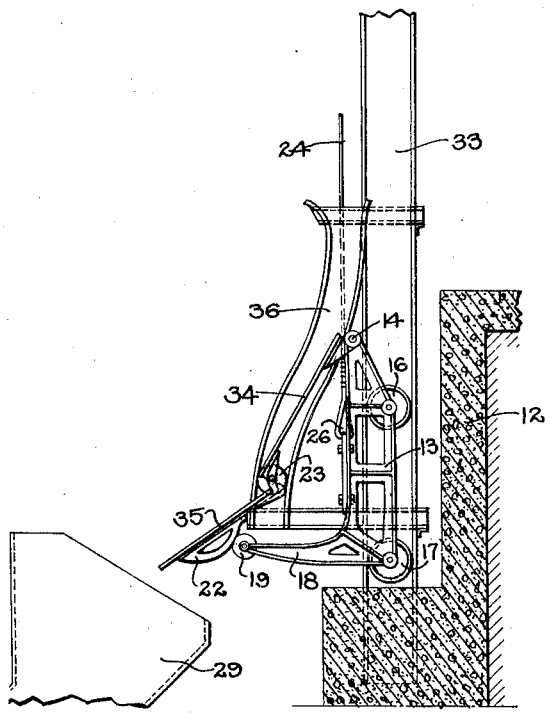
Inventor,
WILLIAM P. ALEXANDER July 9, 1929.  W. P. ALEXANDER  1,720,388
MATERIAL HANDLING APPARATUS
Filed June 20, 1927   3 Sheets-Sheet 3
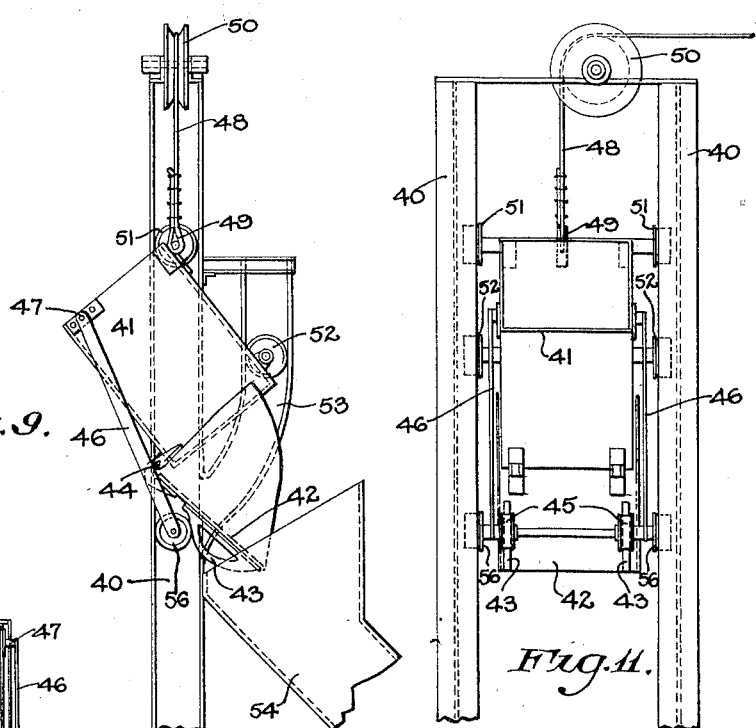
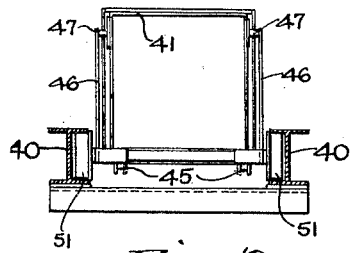
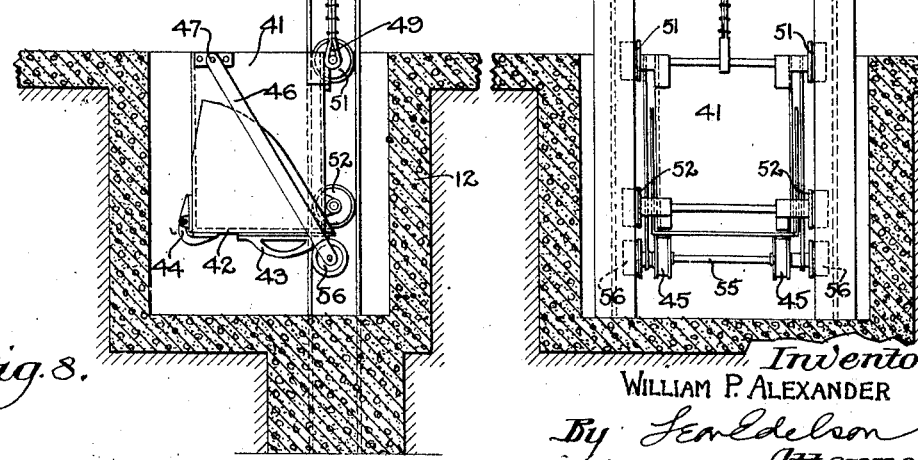
Inventor
WILLIAM P. ALEXANDER Patented July 9, 1929.

1,720,388

UNITED STATES PATENT OFFICE.

WILLIAM P. ALEXANDER, OF MERCHANTVILLE, NEW JERSEY.

MATERIAL-HANDLING APPARATUS.

Application filed June 20, 1927. Serial No. 199,992.

This invention relates to material handling apparatus and more particularly to an apparatus of the elevator type for lifting or lowering as the case may be, various kinds of material from a loading point to another point where the material is discharged into a hopper, chute, or the like.

One of the principal objects of this invention is the provision of a material handling apparatus of improved construction including means for facilitating the discharge of the load when the bucket reaches its proper discharge point.

A further object of the invention is the provision of an apparatus for handling material including a load carrying device, which latter is arranged to be loaded at its upper end and automatically discharged from its bottom end when the device reaches its proper discharge point.

A still further object of the invention is the provision of an apparatus including a bucket or other suitable load supporting device, the bottom of which is pivoted upon said device and is provided with means operatively associated with other means in said apparatus for automatically swinging said bottom downwardly and away from said device whereby to permit the material to be discharged therefrom.

A still further object of the invention is the provision of a material handling apparatus including a pivotally supported bucket or similar load conveying device, a track or runway for guiding the bucket in its travel at the same time that it serves to maintain the bucket in proper load supporting position during the major extent of said travel, and means for tilting the bucket into discharging position simultaneously as the bottom of the bucket is swung downwardly to constitute a discharge chute from the bucket.

A still further object of the invention is the provision of a bottom-dump skip-hoist or similar load carrying device, the bottom of said skip being provided with one or more cam members respectively engageable by suitably arranged cam rollers for maintaining said bottom in load supporting position during the normal travel of the skip and for permitting said bottom to swing into discharging position when the skip arrives at the point of discharge of the load.

Other objects, and objects relating to details of economy and construction, will appear more fully hereinafter.

The invention consists substantially in the construction, combination, location and relative arrangement of parts, all as will be more fully hereinafter set forth, as shown in the accompanying drawings, and finally pointed out in the appended claims.

In the drawings:

Figure 1 is a side elevation of the material handling apparatus constructed in accordance with and embodying the principles of this invention, the apparatus being shown in discharging position;

Figure 2, is a side elevation of the apparatus shown in Figure 1, but showing the apparatus in loading position;

Figure 3 is a top plan view of the apparatus shown in Figure 2;

Figure 4 is an end elevation of the apparatus shown in Figure 2;

Figure 5 is a side elevation of a slightly modified form of the apparatus, this view showing the apparatus in loading position;

Figure 6 is a view corresponding to Figure 5 but showing the apparatus in unloading position;

Figure 7 is a top plan view of the apparatus shown in Figure 5;

Figures 8 and 9 are side elevations of still another modified form of construction showing respectively the apparatus in loading and unloading position;

Figures 10 and 11 are end elevations of Figures 8 and 9 respectively; and

Figure 12 is a top plan view of the apparatus Figure 8.

Referring to the drawings and more particularly to Figures 1 to 4 thereof, it will be seen that the material handling apparatus comprises a main track or runway 10 for guiding the bucket mechanism, designated generally by the reference numeral 11, in its travel. The lower end of the track or runway is suitably supported in any desired manner, in this instance the track being embedded in the base of a concrete pit 12. As appears most clearly in Figures 1 and 2, the bucket mechanism comprises a travelling carriage consisting of a pair of laterally spaced main bracket members 13 to the upper ends of which as at 14, is pivotally supported the bucket or similar load carrying device 15. The bracket members 13 are each of substantially L-shape, the vertical branches thereof being each provided with upper and lower wheels 16 and 17, arranged to travel along the main track or runway 10. The horizontally extending branches 18 of the bracket members 13 are each provided with a roller 19 at the free end thereof for the purpose to be hereinafter set forth. It will be observed that while in Figures 1 to 4, the main track is shown to be in the form of an H-beam and that the wheels 16 and 17 are arranged to ride in the opposite channels of this beam, a slightly different arrangement may be employed as shown in Figure 7 to be described hereinafter.

It will be noticed that the pivotal supports 14 for the bucket 15 lie to one side of the main track 10 such that the bucket 15 tends to hang normally in the position shown in Figure 2. This bucket 15 is of the bottom discharge type, and accordingly the upper end thereof is open to receive the material which is to be handled and the lower end thereof is provided with bottom closure 20, the rear edge of which is pivotally secured to the bucket as at 21. Secured to this pivoted bottom of the bucket are a pair of cam members 22, one cam member being provided for each of the cam rollers 19. As appears most clearly in Figure 2 when the bucket is in loading or charging position the cam rollers 19 are in engagement with the cams 22 of the bottom closure of the bucket and serve to maintain this bottom in closed position. Opposite the sides of the bucket and in approximate alignment with the hinged connection between the bucket and its bottom closure, are a pair of wheels 23 freely rotatable upon a suitable shaft fixed to the bucket in any desired manner.

During the major extent of travel of the bucket 15, all of the parts hereinbefore described are maintained in their relative positions shown in Figure 2, the bucket being lifted by means of a cable 24 passing over the pulleys 25 and thence to a suitable power driven drum (not shown). The lower end of this cable is connected to the carriage 13, as at 26, which carriage in turn carries the bucket 15.

In order to effect discharge of the load from the bucket, an auxiliary pair of tracks 27 are provided opposite the point of discharge. These tracks 27 are curved as shown in Figure 1 and are arranged to lie on either side of the bucket 15 and its carrier members 13. The lower ends of these tracks 27 are provided with flared openings 28 in vertical alignment with the freely rotating wheels 23 of the bucket when the latter is in its normal load carrying position. When the carriage is lifted to the desired elevation, the wheels 23 enter the flared openings 28 of their respective curved tracks 27, and further upward movement of the carriage results in the wheels 23 being pulled upwardly and away from the main track 10 with the result that the bucket 15 assumes the tilted position shown in Figure 1.

At the same time that the wheels 23 begin their travel in the tracks 27 such that the bucket starts to assume its tilted position, it will be evident that the cam members 22 of the bottom closure of the bucket will begin to ride outwardly and over their respective cam rollers 19. Due to the increased curvature of the cam members of the rear ends thereof, the bottom closure 20 of the bucket will be permitted to drop away from the bucket and swing downwardly until it assumes the position shown in Figure 1. In this position the material handling apparatus will have reached a position above the chute or hopper 29 and the bottom closure 20 of the bucket will then form a chute through which the material from the bucket may be discharged into the hopper or chute 29. In the particular form of construction illustrated in Figures 1 to 4, it will be seen that the bottom closure 20 is provided with side walls 30 embracing the side walls of the bucket 15. It will of course be understood that for handling certain kinds of materials and loads these side walls 30 may be readily dispensed with. Further, in this particular construction, it will be seen that the tracks 27 are supported in the desired position by means of suitable structural elements 31 and 32 which latter may be secured in any desirable manner to the main track 10.

That the material handling apparatus just described is readily reversible in operation is well illustrated in Figures 5, 6 and 7. In these figures an arrangement is shown for loading the mechanism at an elevated point and then effecting the automatic discharge of the load at a lower point. The apparatus illustrated is substantially similar to that shown in Figures 1 to 4, inclusive, with the exception that instead of employing a single main track of H-section, the track or runway consists of a pair of channel members 33 arranged on either side of the bucket 15 and its supporting carriage. The wheels 16 and 17 on each bracket member 13 of the carriage face outwardly (see Figure 7) instead of inwardly as in the former instance so that sufficient clearance is provided between the tracks 33 for loading the mechanism. It will also be noticed that in this particular form of apparatus the load supporting or conveying device may take the form of a platform having a back 34 and a bottom 35.

When the members 13 are lowered to the desired elevation, the freely rotating wheels 23 enter the flared openings of the curved tracks 36 (which latter are similar to the tracks 27 of Figure 1, but are in reversed position) and thence travel in said tracks downwardly and outwardly with respect to the main tracks 33 to cause the back 34 of the platform to assume the inclined position shown in Figure 6. At the same time the bottom 35 of the platform also swings downwardly to form an angle of almost 180 degrees with the back 34 of the platform, this angle being dependent entirely upon the curvature of the cam members 22 which are engageable by the cam rollers 19. In either arrangement of the apparatus, whether the bucket is designed to discharge its load after it has traveled upwardly or downwardly, the main wheels 16 and 17 travel constantly in the main tracks 10 or 33 such that the supporting brackets 13 maintain a definite relation with respect to said tracks.

While the load supporting device is shown as being pivotally supported at the point 14 which is off center with respect to the main track 10 or 33, it is to be understood that this device may be pivotally supported on the center line of the track should this arrangement be desired. The bucket or platform would then be suspended between the members 13 of the carriage and the wheels 23 correspondingly positioned on the bracket or platform to enter the flared openings of the auxiliary curved tracks 27 or 36 in the manner and for the purpose already described.

Figures 9 to 14, inclusive, illustrate a modified form of construction. Whereas in the previous forms of apparatus described the loading and unloading of the mechanism takes place on the same side of the main tracks, in the form of apparatus shown in Figures 9 to 14, the bucket is loaded at one side of the main track or tracks and is discharged at the other side thereof.

Referring to Figures 9 and 10, it will be seen that the lower extent of the main runway is essentially similar to the runway 33 of the construction shown in Figures 5 and 6, this runway consisting of a pair of channels 40 presenting toward each other and disposed on either side of the bucket mechanism proper. As in the former instances the bucket 41 is provided with a bottom closure 42 similar to that shown in Figure 1 and secured to this bottom closure are the cam members 43. The closure 42 is pivoted to the bucket at the bottom thereof, as at 44, and is maintained in closed position by the cam rollers 45 which are normally held in engagement with the cam members 43 by means of a bail or yoke 46, the upper ends of which are pivoted, as at 47, to the upper and outer corners of the bucket 41 or otherwise operatively associated with said bucket.

The bucket 41 is lifted vertically by the cable 48, one end of the latter being secured to the bucket as at 49 while the other end thereof passes over the pulley to a winding drum (not shown). Suitably mounted upon the back face of the bucket are upper and lower pairs of wheels 51 and 52, these wheels being arranged to travel in the channeled tracks 40. Due to the fact that the bucket 41 is suspended as at 49 so that its center of gravity is offset from the tracks 40 the tendency of the bucket is to partially rotate in a counter-clockwise direction about the point 49 as the axis of rotation. However, the lower pair of wheels 52, guided as they are by the tracks 40, prevents the bucket from so turning as long as the tracks prevent the wheels 52 from being laterally displaced.

At the point of discharge for the load, however, the main tracks 40 are each provided with an offset auxiliary section 53, the lower ends of which are in communication with the main tracks 40. It will thus be seen that as the bucket is lifted toward the point of discharge the lower wheels 52 will be permitted to swing laterally of the main tracks 40 and into the lower flared ends of the auxiliary track sections 53. Upon lifting the bucket further the rollers 52 will take the path directed by the track sections 53 with the result that the bucket will be tilted in the position shown in Figure 9. Simultaneously as the bucket begins to swing in the counter-clockwise direction the cams 43 of the bottom closure 42 will begin to pass over their respective rollers 45 thereby permitting the said bottom closure to swing downwardly and away from the lower end of the bucket into the position shown in Figure 9. The load carried by the bucket will then be permitted to readily discharge into the chute or hopper 54 which is located on the opposite side of the tracks 40 from which the bucket was originally loaded.

In all the constructions just described it will be apparent that as the bucket, platform or whatever load carrying device is employed is returned to its initial loading position the bottom closure member will be automatically reset to load supporting position. In the form of construction shown in Figures 9 to 14, the cam rollers 45 are rotatably mounted upon a shaft 55 extending transversely below the bottom of the bucket and supported by the lower ends of the bail 46. Mounted upon the free ends of this shaft 55 are the bail-controlling wheels 56, which latter are arranged to travel in the tracks 40 as the bucket is lifted into discharging position or lowered into charging position. It will be obvious to those skilled in the art that the arrangement of apparatus shown in Figures 9 to 14 is as reversible as is the apparatus shown in Figure 1 and is substantially the same manner.

It is to be understood that various changes may be made from time to time in the form, arrangement and construction of the several parts of this material handling apparatus without departing from the real spirit or principles of the invention, and it is accordingly intended to claim the same broadly as well as specifically as indicated in the appended claims.

What is claimed as new and useful is:

1. An apparatus for handling material comprising, in combination, a main trackway extending from the point of loading to beyond the point of discharge, a diverging auxiliary trackway associated with said main trackway opposite the point of discharge, a carriage movable along said main trackway, said carriage being provided with a pair of spaced arms projecting laterally from said main trackway, a conveyor arranged to the same side of said main trackway as said laterally projecting arms and pivotally suspended from the upper end of said carriage, means on said conveyor arranged to enter upon said diverging trackway whereby to effect a tilting movement of said conveyor with respect to said main trackway, a bottom closure for said conveyor swingably mounted with respect thereto, and means on said bottom closure coacting with the free ends of said laterally projecting arms for permitting said closure to assume a load discharging position when said carriage arrives at the point of discharge.

2. An apparatus for handling material comprising, in combination, a main trackway extending from the point of loading to beyond the point of discharge, an auxiliary trackway associated with and diverging from said main trackway opposite the point of discharge, a conveyor carrier movable along said main trackway, the main body of said carrier being arranged to one side of said main trackway and being provided with a pair of laterally extending arms, a conveyor pivotally suspended from the upper edge of and normally abutting said main body of the carrier, guide rollers carried by said conveyor and normally abutting said main body of the carrier, said rollers being arranged to enter upon said diverging trackway whereby to cause said conveyor to assume a tilted position, a swingable bottom closure for said conveyor normally supported in closed position by said laterally extending arms, and means on said closure coacting with the free ends of said arms for permitting said closure to assume a load discharging position when said conveyor is tilted to a predetermined angle.

3. An apparatus for handling material comprising, in combination, a main trackway extending from the point of loading to beyond the point of discharge, an auxiliary trackway associated with and diverging from said main trackway opposite the point of discharge, a conveyor carrier movable along and having a pair of arms projecting laterally from said main trackway, a conveyor pivotally suspended from said carrier above the arms thereof and to one side of said main trackway, a shaft fixed to the bottom edge of said conveyor, a swingable bottom member for said conveyor rotatably supported by said shaft, said bottom member being normally supported in load-supporting position by said laterally projecting arms, and a pair of guide rollers carried by said shaft and arranged to enter upon said diverging trackway whereby to cause said conveyor and its bottom member to assume load discharging positions.

4. An apparatus for handling materials comprising, in combination, a main trackway extending from the point of loading of the material to the point of discharge thereof, a material conveying device arranged to travel along said trackway, said device being arranged for tilting movement about a horizontal axis arranged to one side of said trackway, a diverging auxiliary trackway associated with said main trackway, a bottom dumping member carried by said device and swingable about a horizontal axis located at the said side of said main trackway, and means disposed in the plane common to said aforementioned axes and arranged to enter into said diverging trackway whereby to effect a tilting movement of said conveying device.

5. An apparatus for handling materials comprising, in combination, a conveyor for the material to be handled, a transversely extending shaft fixed to the bottom edge of said conveyor, a bottom closure swingably mounted upon said shaft, a carrier to which the upper edge of said conveyor is pivotally secured, said carrier being provided with a main body against which said conveyor normally abuts and with laterally projecting means for maintaining said bottom closure in load supporting position as said carrier moves from the point of loading to the point of discharge, and means arranged to either side of said aforementioned bottom edge of the conveyor for causing said conveyor and said bottom closure to assume load discharging positions when said conveyor arrives at said point of discharge.

Signed at Philadelphia, county of Philadelphia, State of Pennsylvania, this 14th day of June, 1927.

WILLIAM P. ALEXANDER.